UNITED STATES PATENT OFFICE.

THOMAS A. EDISON, OF LLEWELLYN PARK, NEW JERSEY.

COMPOSITION BRICK AND METHOD OF MAKING SAME.

SPECIFICATION forming part of Letters Patent No. 509,428, dated November 28, 1893.

Application filed March 17, 1893. Serial No. 466,452. (No specimens.)

*To all whom it may concern:*

Be it known that I, THOMAS A. EDISON, a citizen of the United States, residing at Llewellyn Park, in the county of Essex and State of New Jersey, have invented a certain new and useful Improvement in Composition Bricks and Methods of Making the Same, of which the following is a specification.

The object of my invention is to convert, in a simple and economical manner, pulverized metallic ores containing oxides into bricks or lumps of any desired form.

The invention is particularly adapted to use with iron ore.

In carrying my invention into effect in connection with iron ore, the pulverized ore, being first dried, is thoroughly mixed in a suitable mixing machine, with finely pulverized rosin, preferably fine enough to be passed through a fifty-mesh screen. These dried materials being thoroughly mixed together, a small quantity of petroleum, preferably crude petroleum, is introduced into the mixing machine and thoroughly mixed with the ore and rosin. The effect of the petroleum is to soften the rosin and convert it into a very glutinous material. The thoroughly mixed mass is then fed to suitable brick-molding machines, and there converted into the desired form, the mixture of rosin and petroleum, acting to hold the pulverized ore together in a solid mass. The next step is to dry the bricks in a furnace or oven, whereby the petroleum is distilled off, and the heat is continued to a sufficient degree to cause a portion of the rosin to combine with the iron oxide present in the ore to form a resinate of iron. The result of this is that when the bricks are placed in the reducing atmosphere of the blast furnace, the brick will hold together strongly at a red heat, instead of becoming disintegrated at once, the reason being that the resinate of iron is not fusible up to the point of carbonization.

The proportion of rosin mixed with the ore varies in each particular case, according to the kind of ore and the fineness to which it is pulverized. The more coarsely granulated the ore, the more rosin is required to be mixed with it, and the amount of petroleum added to the mixture must be proportionate to the amount of rosin to be acted upon by it.

I have usually found that for each pound of rosin used three-quarters of a pound of crude petroleum should be added.

I have found that iron bricks made by this method are not affected by water, like many of those produced by previous methods.

Instead of adding the petroleum to the mixture of pulverized rosin and ore, or other material, the rosin may be first dissolved in petroleum and the liquid mixed with the material to be bricked. But this modification of my process has the disadvantage that a great excess of petroleum is required in order to make a sufficiently fluid mixture with the rosin to mix conveniently with the pulverized material, which adds difficulty, time and expense to the subsequent operation of driving off the petroleum. If it is attempted to use a rosin and petroleum mixture of little fluidity, a powerful mixing machine and a long time are required to incorporate thoroughly with the pulverized material, which is not the case when the dry rosin is first mixed with the pulverized material and the petroleum afterward added.

I use crude petroleum because of its cheapness, although many of the petroleum distillates act nearly as well.

What I claim is—

1. The herein described method of bricking or lumping pulverized ore, consisting in mixing the same with rosin and petroleum, and forming the mixed material into the desired shape.

2. The method of bricking or lumping pulverized ore, consisting in mixing with such ore powdered rosin, and then adding or mixing therewith petroleum, and forming the material into the desired shape.

3. The herein described method of bricking or lumping pulverized ore, consisting in mixing with such ore powdered rosin, adding and mixing petroleum thereto, and driving off the petroleum by heat.

4. The method of bricking or lumping pulverized metallic ores, consisting in mixing such ore with rosin and petroleum, forming the mixture into the desired shape and then heating the material to a point sufficient to drive off the petroleum, and also to cause a portion of the rosin to combine with the metallic oxide to form a resinate.

This specification signed and witnessed this 15th day of March, 1893.

THOS. A. EDISON.

Witnesses:
JOHN F. RANDOLPH,
THOMAS MAGUIRE.